A. A. LOCKWOOD.
OBTAINMENT OF GOLD AND SILVER FROM THEIR ORES.
APPLICATION FILED MAR. 8, 1918.
1,283,236. Patented Oct. 29, 1918.
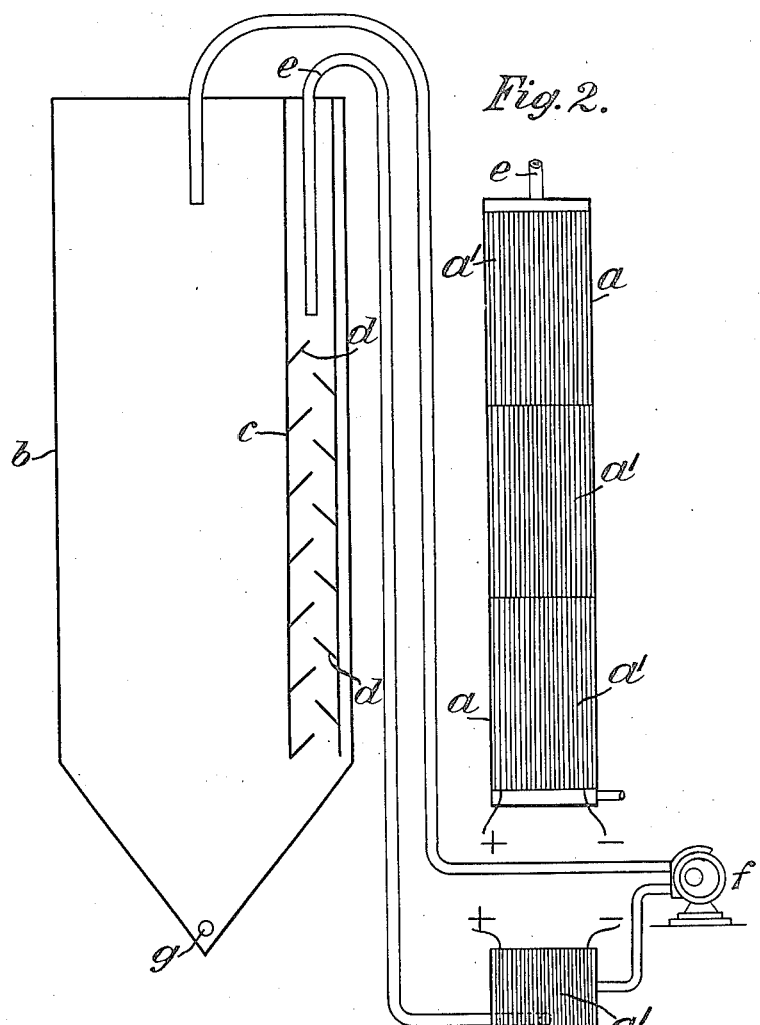

UNITED STATES PATENT OFFICE.

ALFRED ANDREW LOCKWOOD, OF FOREST HILL, ENGLAND.

OBTAINMENT OF GOLD AND SILVER FROM THEIR ORES.

1,283,236.     Specification of Letters Patent.     Patented Oct. 29, 1918.

Application filed March 8, 1918. Serial No. 221,151.

*To all whom it may concern:*

Be it known that I, ALFRED ANDREW LOCKWOOD, a subject of the King of Great Britain, residing at 55 Kilmorie road, Forest Hill, in the county of Surrey, England, have invented new and useful Improvements in or Relating to the Obtainment of Gold and Silver from Their Ores, of which the following is a specification.

This invention relates to a process by which gold and silver may be precipitated directly from a pulped ore without filtration.

According to this invention I lead a gold pulp or a silver pulp from a cyaniding vessel provided with agitating means to one end of a precipitating vessel containing a series of longitudinally arranged depending electrodes, and pass a current through the pulp kept in suspension by a jet of air, means being also provided for removing the pulp from the other end of the vessel and leading it back into the cyaniding vessel.

The cathodes may be formed of lead coated iron or mild steel plates. The anodes also preferably consist of iron plates formed of an iron containing 30 to 40% of silicon and known in commerce by the name of tantiron.

Pulp from the cyaniding vessel is led into an open vessel containing a series of anodes and cathodes about one inch apart and hung from supports at the top and a small low tension current is passed between them.

In order that no coarse ore shall pass into the precipitating vessel from the cyaniding vessel this latter is provided with a separator preferably consisting of a pipe of square section extending downward near to the bottom thereof and provided with interior upwardly sloping baffles. The pulp is drawn off from the top of the separator by a siphon or pipe.

The invention is illustrated in the accompanying drawings in which Figure 1 is a side elevation of the plant and Fig. 2 a plan of the precipitating vessel.

In the drawings $a$ is an open precipitating vessel with depending electrodes $a^1$ and an air inlet pipe $a^2$ for maintaining the ore in suspension.

$b$ is a cyaniding vessel containing pulp.

$c$ is a compartment provided with perforated baffle plates $d$.

$e$ is a siphon for leading pulp from the compartment $c$ into the vessel $a$, and $f$ is a pump for leading the pulp back into the cyaniding vessel $b$. $g$ is a pipe through which air is delivered for maintaining the ore in suspension.

What I claim is:—

1. A process for treating gold and silver ores which consists in agitating the pulped ore in a bulk of cyaniding solution, leading a continuous current of pulp from this bulk to one end of a separate electrolytic precipitating vessel which contains a series of longitudinally arranged depending electrodes, passing the pulp through a current of the necessary density to precipitate the precious metal maintaining the pulp in suspension in the precipitating vessel by a jet of air, removing the pulp from the other end of the vessel, leading it back to the cyaniding vessel and repeating the cycle of operations, all without filtration or sedimentation of the pulp.

2. A process of obtaining precious metals from ores, which comprises mixing the ore with a cyaniding solution, in such proportions as to produce a flowable pulp, agitating and aerating the pulp by introducing a current of air at the lower end thereof, passing a continuous current of the pulp first as an ascending slow stream, whereby coarser pieces of the ore may separate, and then to an electrolytic apparatus containing depending cathodes and depending insoluble anodes, passing a current from said anodes to said cathodes, while agitating the pulp to prevent sedimentation thereof, and returning the pulp after electrolysis to the main supply of pulp, all in a cyclical continuous process, without filtration of the pulp.

3. A process for treating gold and silver ores which consists in agitating the pulped ore in a bulk of cyaniding liquor, leading a continuous stream of the pulp from this bulk to one end of a precipitating vessel which contains a series of longitudinally arranged depending electrodes, comprising lead coated iron cathode plates, passing an electrolytic current through the pulp, maintaining the pulp in suspension in the precipitating vessel by a jet of air, removing the pulp from the other end of the vessel, leading it back to the bulk of cyaniding liquor and repeating the cycle of operations, all without filtration of the pulp.

4. A process for treating gold and silver ores which consists in agitating a bulk of finely divided ore in a cyaniding liquor, leading a stream of the pulp from this bulk to an electrolytic vessel which contains a series of longitudinally arranged depending electrodes, comprising anode plates formed of iron containing 30 to 40 per cent. of silicon, and returning the electrolytically treated pulp back to the main bulk, and repeating the cycle of operations all without filtration of the pulp.

5. An apparatus for the electro-deposition of metals from metalliferous material in the form of a liquid pulp, comprising a vertically elongated mixing and leaching tank, an air inlet at the lower part of the said tank for aerating and agitating the pulp therein, a vertically arranged baffle chamber located in said tank not over said air inlet means, an electrolytic tank containing vertical depending electrodes, an outlet siphon drawing from the upper part of said baffle chamber to said electrolytic tank, whereby liquid carrying only the finer particles of undissolved metalliferous material and gangue is siphoned to said electrolytic tank, air inlet means at the lower part of said electrolytic tank to prevent sedimentation of metalliferous material and gangue therein, and means for forcing the electrolytically treated pulp back to said leaching tank.

ALFRED ANDREW LOCKWOOD.